United States Patent [19]
Chen et al.

[11] Patent Number: 6,020,045
[45] Date of Patent: Feb. 1, 2000

[54] TEXTURED MAGNETIC RECORDING MEDIUM HAVING A TRANSITION ZONE

[75] Inventors: Ga-Lane Chen, Fremont; Jialuo Jack Xuan, Milpitas, both of Calif.

[73] Assignee: Seagate Technology, Inc., Scotts Valley, Calif.

[21] Appl. No.: 08/702,438

[22] PCT Filed: Jun. 5, 1996

[86] PCT No.: PCT/US96/09330

§ 371 Date: Sep. 24, 1996

§ 102(e) Date: Sep. 24, 1996

[87] PCT Pub. No.: WO97/47001

PCT Pub. Date: Dec. 11, 1997

[51] Int. Cl.[7] ............... B05D 3/00; B05D 5/12; G11B 5/66; G11B 5/70
[52] U.S. Cl. ............ 428/141; 427/555; 427/556; 427/557; 427/129; 427/131; 428/694 TR; 428/694 TP; 428/694 SG
[58] Field of Search ............... 427/555, 554, 427/556, 557, 558, 129, 131; 428/141, 694 T, 694 TP

[56] References Cited

U.S. PATENT DOCUMENTS

| | | |
|---|---|---|
| 3,674,340 | 7/1972 | Jacob . |
| 3,764,218 | 10/1973 | Schedewie . |
| 3,938,878 | 2/1976 | Fox . |
| 4,060,306 | 11/1977 | Swaminathan . |
| 4,139,263 | 2/1979 | Lehureau et al. . |
| 4,724,219 | 2/1988 | Ridinger ............... 427/555 |
| 5,062,021 | 10/1991 | Ranjan et al. . |
| 5,128,914 | 7/1992 | Kurata et al. . |
| 5,166,606 | 11/1992 | Lal et al. . |
| 5,167,096 | 12/1992 | Eltouky et al. ......... 51/281 SF |
| 5,202,810 | 4/1993 | Nakamura et al. . |
| 5,273,834 | 12/1993 | Hoover et al. . |
| 5,391,522 | 2/1995 | Goto et al. . |
| 5,402,407 | 3/1995 | Eguchi et al. . |
| 5,416,755 | 5/1995 | Endo et al. . |
| 5,506,017 | 4/1996 | Ranjan et al. ............. 427/131 |
| 5,520,981 | 5/1996 | Yang et al. ............... 428/65.5 |
| 5,567,484 | 10/1996 | Baumgart et al. ........ 427/555 |
| 5,582,878 | 12/1996 | Ogawa et al. ............. 427/129 |
| 5,586,040 | 12/1996 | Baumgart et al. ........ 427/128 |
| 5,595,791 | 1/1997 | Baumgart et al. ........ 427/129 |
| 5,614,114 | 3/1997 | Owen ..................... 427/555 |
| 5,853,820 | 12/1998 | Kuo et al. ............... 427/555 |

FOREIGN PATENT DOCUMENTS

| | | |
|---|---|---|
| 583989 A2 | 2/1994 | European Pat. Off. . |
| 195 24 220 A1 | 1/1996 | Germany . |

OTHER PUBLICATIONS

Translation of Arita et al PE 195 24 220 A1 (Patent previously cited) Jan. 1996.

Chrisey et al, ed, *Pulsed Laser Deposition of Thin Films*, John Wiley & Sons, Inc. N.Y., excerpts p. 34–39, 1994 (no month).

Abstracts of 1996 Intermag Conference, Seattle, WA; p. HA–01: Kuo et al "Design of laser Zone texture for low Glide Media"; p. HA–02:Teng et al, "Laser zone texture on Alternate Substrate disks"; p. HA–05: Kozu et al"Tribological Behavior of Ridgid disks . . . ", 1996 no month given.

Krajnovich et al; Abstracts of 1996 Intermag Conference, Seattle, WA; page unknown "Experimental & Theoretical Studies of Bump Formation During Laser Texturing of N–P " 1996 no month .

(List continued on next page.)

*Primary Examiner*—Marianne Padgett
*Attorney, Agent, or Firm*—McDermott, Will & Emery

[57] ABSTRACT

A magnetic recording medium is provided with a textured surface comprising a landing zone, a data zone, and a transition zone having protrusions which gradually decrease in height and diameter in progressing from the landing zone to the data zone. The transition zone can be formed by laser texturing and controlling the peak power of a pulsed laser beam and/or rotating speed of the surface undergoing texturing.

29 Claims, 5 Drawing Sheets

OTHER PUBLICATIONS

Tam et al, Experimental & Theoretical Studies of Bump Formation During Laser Texturing of Ni–P Disk substrates; IEEE Transactions on Magnetics, vol. 32, No. 5 pp. 3771–3773 Sep. 1996.

P. Baumgart et al., "A New Laser Texturing Technique For High Performance Magnetic Disk Drives," IEEE Trans. on Mag, vol. 31, No. 6, pp. 2946–2951, Nov. 1995.

TEXTURED MAGNETIC RECORDING MEDIUM HAVING A TRANSITION ZONE

This application is a 371 of PCT/US96/09330 filed Jun. 5, 1996.

TECHNICAL FIELD

The present invention relates to the recording, storage and reading of magnetic data, particularly rotatable magnetic recording media, such as thin film magnetic disks having textured surfaces for contact with cooperating magnetic transducer heads. The invention has particular applicability to high density magnetic recording media exhibiting low noise and having improved flying stability, glide performance and head-media interface reliability.

BACKGROUND ART

Magnetic disks and disk drives are conventionally employed for storing data in magnetizable form. Typically, one or more disks are rotated on a central axis in combination with data transducer heads positioned in close proximity to the recording surfaces of the disks and moved generally radially with respect thereto. Magnetic disks are usually housed in a magnetic disk unit in a stationary state with a magnetic head having a specific load elastically in contact with and pressed against the surface of the disk.

In operation, the magnetic disk is normally driven by the contact start stop (CSS) method, wherein the head begins to slide against the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk. During reading and recording operations, the transducer head is maintained at a controlled distance from the recording surface, supported on a bearing of air as the disk rotates. The magnetic head unit is arranged such that the head can be freely moved in both the circumferential and radial directions of the disk in this floating state allowing data to be recorded on and retrieved from the surface of the disk at a desired position.

Upon terminating operation of the disk drive, the rotational speed of the disk decreases and the head begins to slide against the surface of the disk again and eventually stops in contact with and pressing against the disk. Thus, the transducer head contacts the recording surface whenever the disk is stationary, accelerated from a stop and during deceleration just prior to completely stopping. Each time the head and disk assembly is driven, the sliding surface of the head repeats the cyclic operation consisting of stopping, sliding against the surface of the disk, floating in the air, sliding against the surface of the disk and stopping.

It is considered desirable during reading and recording operations to maintain each transducer head as close to its associated recording surface as possible, i.e., to minimize the flying height of the head. This objective becomes particularly significant as the areal recording density increases. The areal density (Mbits/in$^2$) is the recording density per unit area and is equal to the track density (TPI) in terms of tracks per inch times (x) the linear density (BPI) in terms of bits per inch. Thus, a smooth recording surface is preferred, as well as a smooth opposing surface of the associated transducer head, thereby permitting the head and the disk to be positioned in closer proximity with an attendant increase in predictability and consistent behavior of the air bearing supporting the head. However, another factor operates against that objective. If the head surface and recording surface are too flat, the precision match of these surfaces gives rise to excessive stiction and friction during the start up and stopping phases, thereby causing wear to the head and recording surfaces eventually leading to what is referred to as a "head crash." Thus, there are competing goals of reduced head/disk friction and minimum transducer flying height.

In order to satisfy these competing objectives, the recording surfaces of magnetic disks are conventionally provided with a roughened surface to reduce the head/disk friction by techniques referred to as "texturing." Conventional texturing techniques involve polishing the surface of a disk substrate to provide a texture thereon prior to subsequent deposition of layers, such as an underlayer which is typically chromium or a chromium-alloy, a magnetic layer, a protective overcoat which typically comprises carbon, and a lubricant topcoat, wherein the textured surface on the substrate is intended to be substantially replicated on the surface of the magnetic disk.

A typical magnetic recording medium is depicted in FIG. 1 and comprises a substrate 10, typically an aluminum (Al)-base alloy, such as an aluminum-magnesium (Al—Mg) alloy, plated with a layer of amorphous nickel-phosphorous (NiP). Substrate 10 typically contains sequentially deposited thereon a chromium (Cr) underlayer 11, a magnetic layer 12 which is usually a cobalt (Co)-base alloy, a protective overcoat 13 which usually comprises carbon, and a lubricant topcoat 14. Cr underlayer 11, Co-base alloy magnetic layer 12 and protective carbon overcoat 13 are typically deposited by sputtering techniques. A conventional Al-alloy substrate is provided with a NiP plating primarily to increase the hardness of the Al substrate, serving as a suitable surface on which to provide the requisite surface roughness or texture, which is substantially reproduced on the disk surface.

The escalating requirements for high areal recording density impose increasingly greater requirements on thin film magnetic media in terms of coercivity, squareness, low medium noise and narrow track recording performance. In addition, increasingly high density and large-capacity magnetic disks require increasingly small flying heights, i.e., the distance by which the head floats above the surface of the disk in the CSS drive. The requirement to further reduce the flying height of the head imposed by increasingly higher recording density and capacity render it particularly difficult to satisfy the requirements for controlled texturing to avoid head crash.

The conflicting requirements for minimum transducer flying height and texturing can be alleviated to some extent by providing a separate landing or CSS zone and a separate data zone. In this way, the surface of the data zone can be optimized for data storage and retrieval, while the landing zone can be optimized for texturing to satisfy the CSS requirements. Such a textured surface comprising a head landing zone and a data recording zone can be produced by initially polishing the surface and then laser texturing to form the head landing zone leaving a polished data zone. However, the resulting surface would contain undesirable abrupt topographical changes between the landing zone and the data zone.

Abrupt topographical changes on the surface of a magnetic recording medium adversely affect the flying stability and glide performance of magnetic recording heads, and detrimentally affect the reliability of the head-medium interface. Moreover, such problematic local abrupt profile changes require greater precision in texturing.

Accordingly, there exists a need to provide a textured surface for high areal recording density having a data zone optimized for data recordation and retrieval, and a landing zone having topography optimized for CSS operation, without abrupt topographical changes between the data zone and the landing zone.

DISCLOSURE OF THE INVENTION

An object of the present invention is a magnetic recording medium having a textured surface with a data zone optimized for recording and a landing zone optimized for head landing, without abrupt topographical changes between the data and landing zones.

Another object of the present invention is a method of texturing a magnetic recording medium to provide a data zone optimized for recording and a landing zone optimized for CSS performance, without abrupt topographical changes between the data and landing zones.

Additional objects, advantages and other features of the invention will be set forth in part in the description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by a magnetic recording medium having a textured surface which comprises: a data zone; a textured landing zone comprising a plurality of protrusions extending to a substantially uniform height above the surface; and a textured transition zone; wherein the transition zone comprises a plurality of protrusions having gradually reduced heights and diameters in progressing from the landing zone to the data zone.

Another aspect of the present invention is a method of manufacturing a magnetic recording medium, which method comprises forming a textured surface on a layer of a magnetic recording medium, which textured surface comprises: a data zone; textured a landing zone comprising a plurality of protrusions extending to a substantially uniform height above the surface; and a laser textured transition zone between the landing zone and the data zone; wherein the transition zone comprises a plurality of protrusions having gradually reduced heights and diameters in progressing from the landing zone to the data zone.

Additional objects and advantages of the present invention will become readily apparent to those skilled in this art from the following detailed description, wherein the embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

Figure 1:
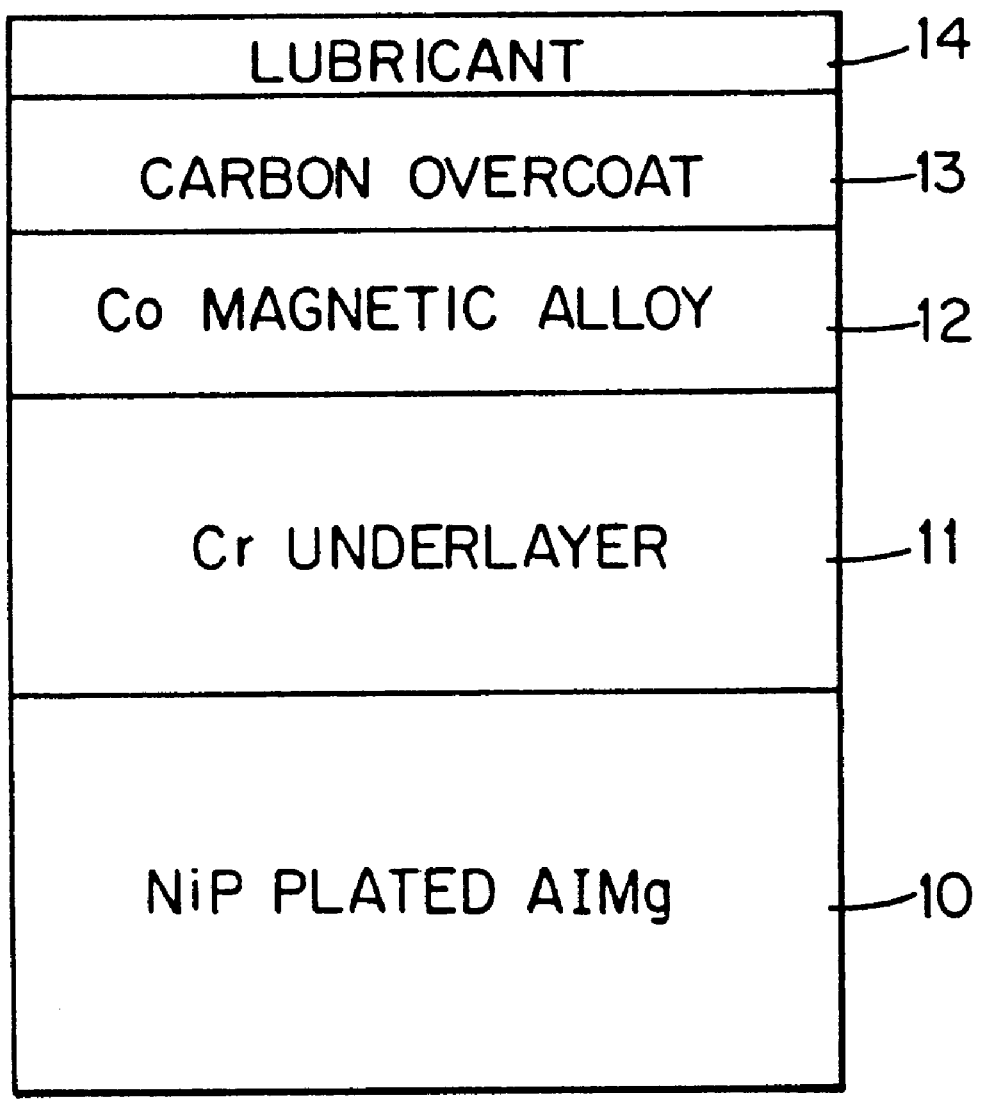
FIG. 1 illustrates a conventional magnetic recording medium structure.

The present invention addresses the conflicting requirements for reduced head/disk friction and minimum transducer flying height in a conventional CSS system, in addition to maximizing the areal recording density. Such conflicting requirements are resolved by providing a magnetic recording medium with a textured surface comprising a landing zone and a data zone, each zone optimized for its particular function. However, the present invention goes one step further by addressing and solving problems generated by providing a textured surface having an optimum landing zone adjacent an optimized data recording zone.

The optimization of a textured landing zone for reduced head/disk friction and optimization of a data zone for minimum transducer flying height adjacent to the landing zone on the same surface creates abrupt topographical profile changes. Such abrupt topographical changes require painstaking precision in conducting the CSS technique. The present invention addresses and solves that problem by providing a transition zone between the landing zone and the data zone, wherein the topography of the transition zone is tailored to preclude abrupt profile changes. In accordance with the present invention, a transition zone is provided between a textured landing zone comprising a plurality of protrusions extending above a surface and a relatively smoother data zone on the surface, which transition zone comprises a plurality of protrusions having reduced heights and diameters in progressing from the landing zone to the relatively smoother data zone.

In the various embodiments of the present invention, a surface of a magnetic recording medium, such as a substrate or underlayer formed on the substrate, such as chromium or a chromium-alloy, can be polished by a conventional polishing technique. A textured landing zone can then be formed by any conventional technique, such as by mechanical polishing or laser texturing. Desirably, the landing zone is laser textured to form a plurality of relatively uniform protrusions extending to a substantially uniform height above the surface. A suitable laser texturing technique is disclosed in copending application Ser. No. 08/666,374, wherein a multiple lens focusing system is employed to enable the formation of an accurately controlled pattern of substantially uniform protrusions having a conveniently smaller size than that obtained with conventional single lens focusing systems. Application Ser. No. 08/666,374 is incorporated herein in its entirety.

Another suitable laser texturing technique for forming a landing zone is disclosed in copending application Ser. No. 08/647,407, wherein a focused laser light beam is passed through an optical crystalline material interposed and spaced apart between a lens focusing system and the surface undergoing a laser texturing, to obtain a texture comprising a plurality of controlled and accurately spaced apart protrusions. Application Ser. No. 08/647,407 is incorporated herein in its entirety.

In addition, a landing zone can advantageously be formed by laser texturing employing the combined techniques of application Ser. No. 08/666,373 and application Ser. No. 08/647,407, wherein a pulsed laser light beam emitted from a multiple lens focusing system is passed through an optical crystalline material to the surface undergoing laser texturing.

In employing a glass or glass-ceramic substrate, it is advantageous to employ the laser texturing technique disclosed in application Ser. No. 08/666,373, the entire disclosure which is incorporated herein in its entirety by reference. In copending application Ser. No. 08/666,373, a technique is disclosed for laser texturing a landing zone on a glass or glass-ceramic substrate employing a pulsed laser light source having a wavelength of about 10 $\mu$m, such as a laser light beam derived from a $CO_2$ laser source.

Upon providing a texturing landing zone, as by laser texturing, a polished data zone would remain. In an embodiment of the present invention, the data zone remains polished, although the data zone can also be textured. After forming the landing zone and data zone, the transition zone of the present invention is formed. Laser texturing has been found to be a suitable technique for forming the transition zone.

In accordance with an embodiment of the present invention, the surface is rotated and exposed to a pulsed laser light beam, preferably commencing at the landing zone and moved in a radial direction to the data zone which will begin at a terminal point of the transition zone. During exposure of the surface to a pulsed laser light beam to form the transition zone, variables affecting the geometry of the protrusions are adjusted to form a transition zone having protrusions with spirally reduced heights and diameters in progressing from the landing zone to the data zone. One having ordinary skill in the art would easily recognize appropriate parameters and adjustments necessary to achieve formation of a gradual transition zone between a landing zone and a data zone. For example, such a controlled transition zone can be achieved by controlling the emission of the laser pulse power, laser pulse width and target movement. The height and diameter of a protrusion generated by pulsed laser light beam texturing decreases as the peak pulse power decreases, and increases as the speed at which the surface is rotated decreases.

The present invention advantageously provides a magnetic recording medium with a textured surface comprising three zones, optimized to meet functional demands for recording and CSS performance while avoiding abrupt topographical changes therebetween, thereby improving the flexibility of the CSS process. Such a three zone texture pattern can most advantageously be laser textured using a computer-controlled laser means associated with precision automation equipment. By controlling the emission of the laser pulse power, laser pulse width and target movement, the desired profiles of all three zones can be obtained for different head designs.

The transition zone of the present invention can be formed employing conventional laser texturing techniques. It has been found that an accurately tailored transition zone can be formed utilizing a multiple lens focusing system, such as that disclosed in copending application Ser. No. 08/666,374, to form an accurately controlled pattern of substantially uniform protrusions having a conveniently smaller size than that obtained with a conventional single lens focusing system.

In another embodiment of the present invention, the transition zone is formed by the laser texturing technique disclosed in copending application Ser. No. 08/647,407, wherein a focused laser light beam is passed through an optical crystalline material interposed and spaced apart between lens focusing system surface undergoing laser texturing, to obtain a texture comprising a plurality of controlled and accurately spaced apart protrusions.

In another embodiment of the present invention, the transition zone is formed by the combined use of the multiple lens focusing system disclosed in copending application Ser. No. 08/666,374 and the use of an optical crystalline material as disclosed in copending application Ser. No. 08/647,407. In accordance with this embodiment, a laser light beam focused by a multiple lens focusing system is passed through an optical crystalline material prior to impinging upon the surface undergoing laser texturing to form the transition zone.

In accordance with the present invention, manufacturing is simplified and throughput increased by laser texturing the landing zone and transition zone employing the same type of laser texturing system. In accordance with the present invention, the data zone can remain polished or subjected to a laser texturing technique as well.

Figure 2:
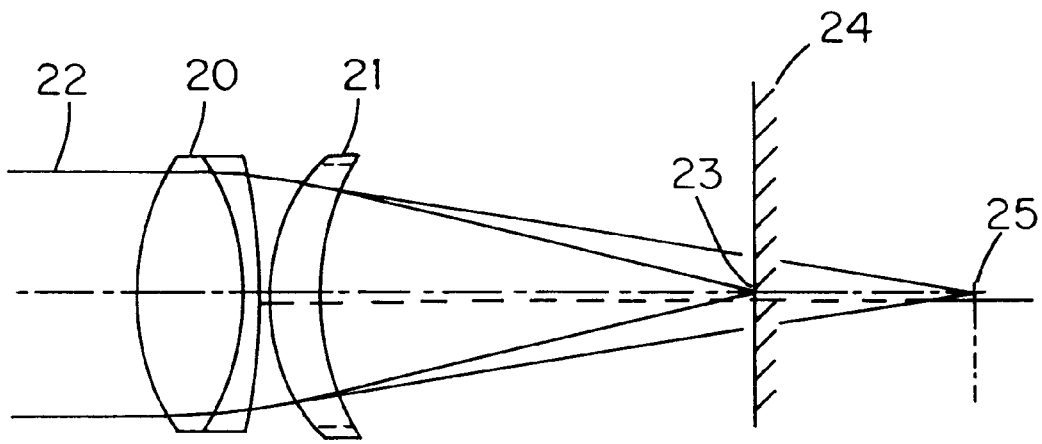
FIG. 2 schematically depicts a multiple lens laser focusing system for use the present invention.

In an embodiment of the present invention, the transition zone and/or landing zone are laser textured employing a multiple lens focusing system as disclosed in copending application Ser. No. 08/666,374 and illustrated in FIG. 2, which system comprises a first lens 20, such as a companion doublet, and a second lens 21, such as an aplanatic meniscus lens. Second lens 21 is spaced apart and positioned between first lens 20 and rotating substrate 24 the surface of which is undergoing laser texturing. First lens 20 has a focal point at the upper surface of substrate 24, as at 23. However, the depth of focus of the multiple lens focusing system is extended by virtue of second lens 21 to point 25. The increased depth of focus provides the desired flexibility, enabling the formation of protrusions having a smaller height and diameter with greater precision and uniformity vis-à-vis a conventional single lens focusing system. Significantly, by providing an increased depth of focus, adjustment and maintenance of the focus is facilitated, thereby providing a tolerance to accommodate inherent surface uniformity which is unattainable in a conventional single lens laser focusing systems.

Figure 3:
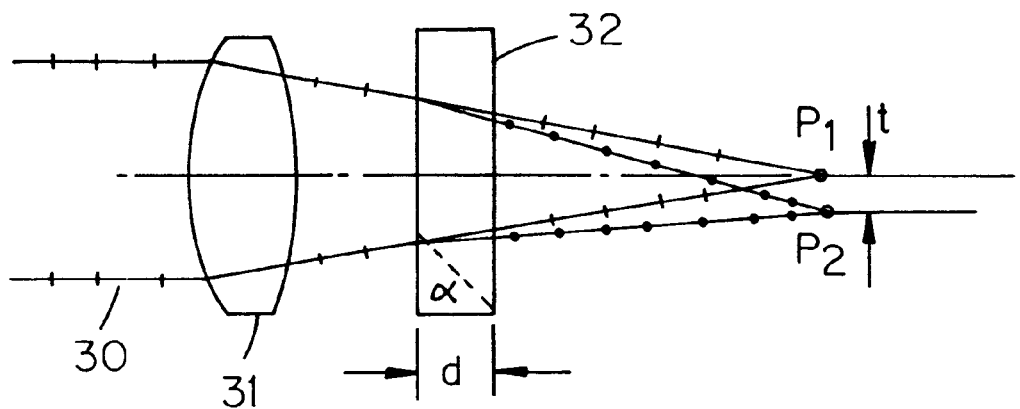
FIG. 3 schematically depicts a laser focusing system employing a crystalline material for use in the present invention.

In another embodiment of the present invention, the transition zone and/or landing zone are laser textured employing a system comprising an optical crystalline material as disclosed in copending application Ser. No. 08/647,407 and shown in FIG. 3, wherein pulsed laser light beam 30 is focused through lens 31. An optical crystalline material 32, which can comprise any of various optical crystalline materials, such as calcite or quartz, is interposed in the path of the pulsed, focused laser light beam. Optical crystalline material 32 is selected to have a thickness d and a crystal-induced optical access angle $\alpha$, thereby creating two focus point p1 and p2 having different energy intensities. The focusing points p1 and p2 are separated by a distance t which is the function of the crystal thickness d and a crystal-induced optical access angle $\alpha$.

In another embodiment of the present invention, the transition zone and/or landing zone are laser textured employing both the multiple lens focusing system and an optical crystalline material positioned so that the focused pulsed laser light beam passes through the optical crystalline material before impinging on the surface undergoing laser texturing.

The laser texturing technique of the present invention can be employed to texture a magnetic recording medium by impinging a focused laser beam not only on a rotating substrate, as in the embodiments previously disclosed, but on any layer of the magnetic recording medium. Thus, in accordance with the present invention, an underlayer, such as a Cr or Cr-alloy underlayer, or magnetic layer, such as a Co-alloy magnetic layer applied on an underlayer or applied directly on a substrate, can be laser textured to form a transition zone and/or a landing zone, as with a pulsed laser light beam through a multiple lens focusing system and/or a pulsed laser light beam through an optical crystalline material. The laser textured pattern comprising three zones in accordance with the present invention can be provided directly on an Al or Al-alloy substrate on such a substrate after a conventional Ni—P plating has been applied. The laser textured surface provided in accordance with the present invention is substantially replicated in subsequently deposited layers.

The magnetic recording media produced in accordance with the present invention can comprise any of various conventional substrates employed in the production of magnetic recording media. Such conventional substrates include Al, Al-alloys, such as Al—Mg alloys, NiP plated Al or NiP plated Al-alloys. In addition, alternative substrates such as glass and glass-ceramic material can be employed in the practice of the present invention to form a textured surface comprising a landing zone, recording zone and transition zone.

In yet another embodiment of the present invention, a substrate comprising a glass or glass-ceramic material is laser textured to form a transition zone, landing zone and data zone, employing the pulsed laser light beam texturing system disclosed in copending application Ser. No. 08/666,373.

Figure 4:
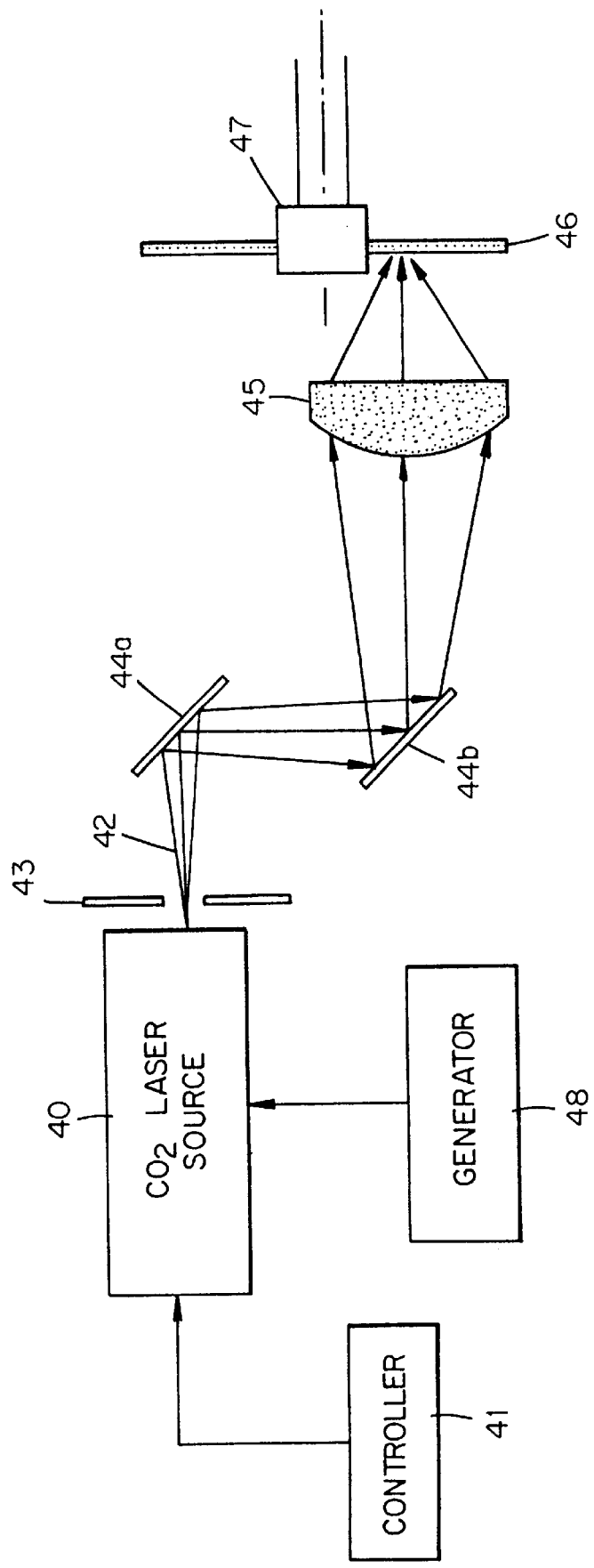
FIG. 4 schematically depicts a laser texturing system for use with a glass or glass-ceramic substrate.

A laser texturing system for use with a glass or glass-ceramic substrate in accordance with the present invention is schematically depicted in FIG. 4, and comprises $CO_2$ laser source 40, controlled by controller 41 and powered by generator 48. Emitted laser light beam 42 passes through shutter 43 to an optical system 44 comprising mirrors 44a and 44b, such as silicon mirrors, and focusing lens 45 for focusing the pulsed laser light beam onto the surface of the glass or glass-ceramic substrate 46 rotated by spindle 47. It has been found advantageous to provide lens 45 with a suitable coating, such as lead selenide.

Figure 5:
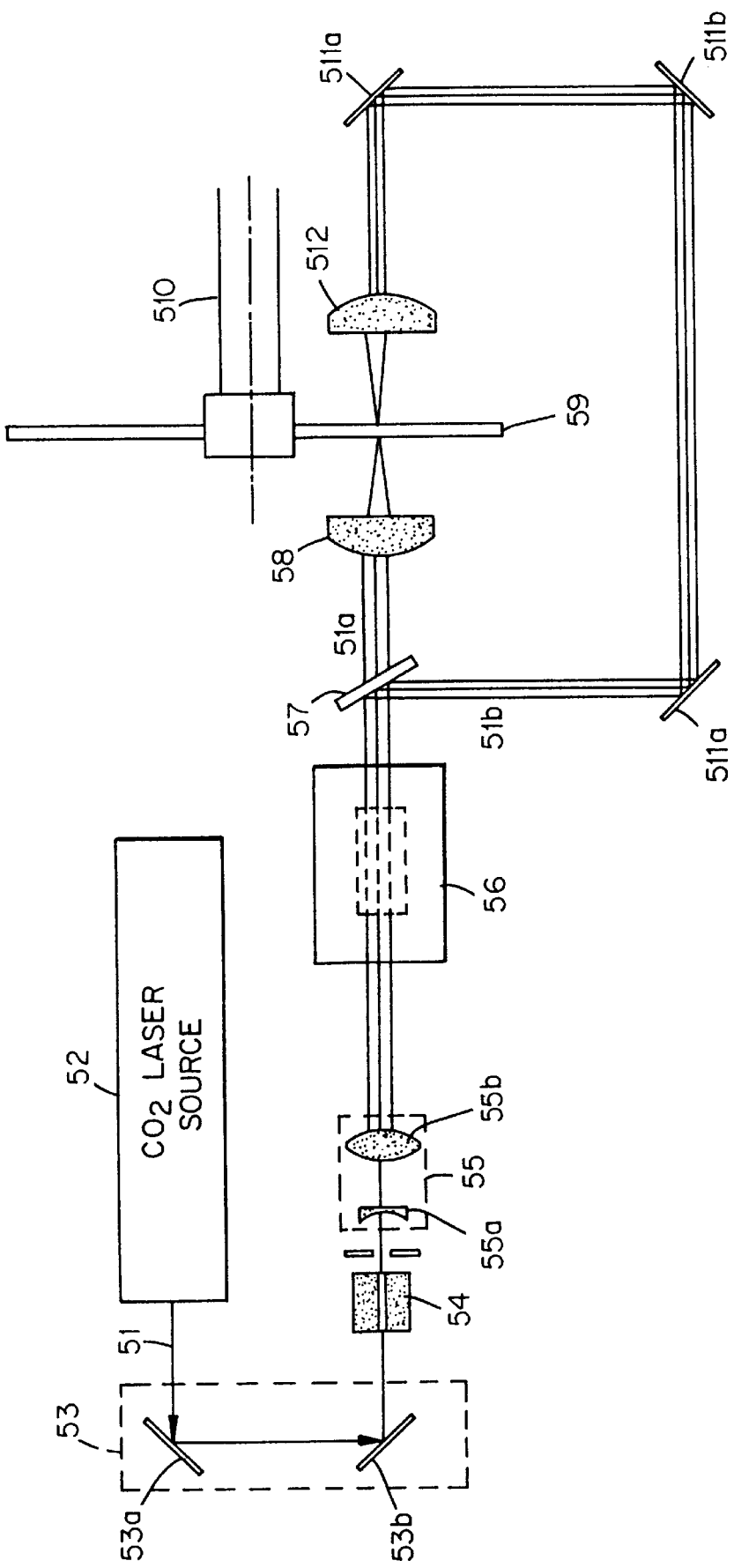
FIG. 5 schematically illustrates another laser texturing system for use with a glass or glass-ceramic substrate.

Another laser texturing system for use with a glass or glass-ceramic substrate is schematically depicted in FIG. 5, wherein a laser light beam 51 generated by a $CO_2$ laser source 52 passes to beam delivery system 53 comprising mirrors 53a and 53b. Laser light beam 51 then passes through modulator 54, beam expander 55, comprising a concave lens 55a and a doublet achromatic lens 55b, and then through polarization rotator 56 to beam splitter 57 where it is separated into components 51a and 51b. Laser light beam component 51a passes to diffractive focusing lens 58 and is focused on a first surface of glass or glass-ceramic substrate 59 rotated by spindle 510. Laser light component 51b is reflected off mirrors 511a, 511b and 511c, such as silicon mirrors, to second diffractive focusing lens 512 and onto the opposite second surface of substrate 59. The diffractive focusing lenses 58 and 512 are advantageously coated with zinc selenide.

Figure 6:
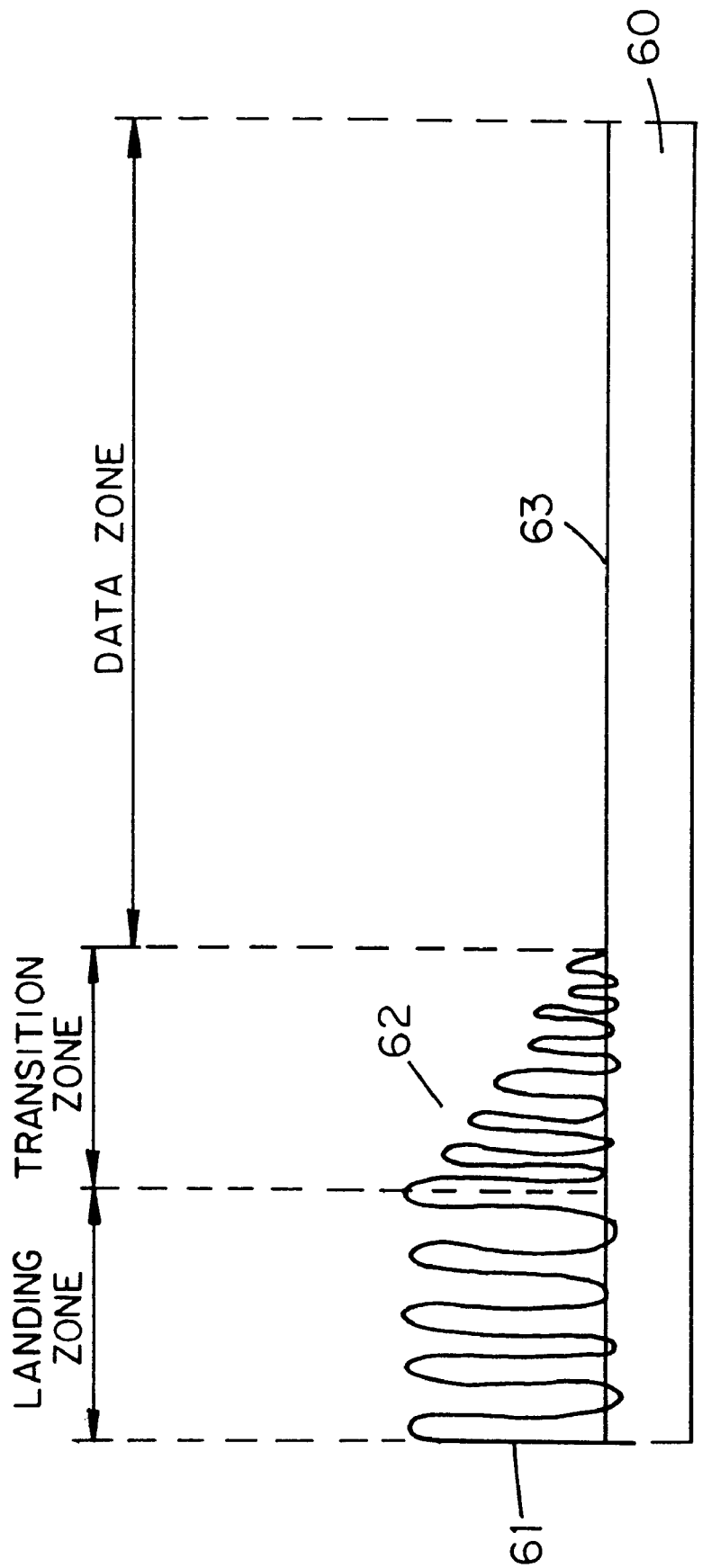
FIG. 6 schematically depicts a textured surface formed in accordance with the present invention.

A laser textured surface formed in accordance with the present invention is schematically illustrated in FIG. 6 and comprises a layer 60 of a magnetic recording medium. Such a layer can be the substrate, underlayer formed on the substrate or a magnetic layer. The textured surface of the present invention comprises three zones, i.e., a landing zone, transition zone and data zone. The landing zone comprises a plurality of protrusions 61 extending to a substantially uniform height above the textured surface. Data zone 63 is illustrated as polished; however, data zone 63 can also be laser textured, in which case the data zone comprises a plurality of protrusions extending to a relatively uniform height above the substrate surface but significantly lower than the height of the protrusions in the landing zone, or a pattern of grooves formed in the surface. The transition zone comprises a laser textured region having protrusion 62 with heights and diameters gradually decreasing and progressing from the landing zone to the data zone, thereby eliminating abrupt topographical changes and their attendant problems.

The magnetic layers deposited in accordance with the present invention can be any of those conventionally employed in the production of magnetic recording media. Such conventional magnetic alloys, include, but are not limited to, cobalt (Co)-base alloys, such as cobalt-chromium (CoCr), cobalt-samarium (CoSm), cobalt-chromium-tantalum (CoCrTa), cobalt-nickel-chromium (CoNiCr), cobalt-chromium-samarium (CoCrSm), cobalt-chromium-platinum-tantalum (CoCrPtTa), cobalt-chromium-platinum (CoCrPt), cobalt-nickel-platinum (CoNiPt), cobalt-nickel-chromium-platinum (CoNiCrPt) and cobalt-chromium-platinum-boron (CoCrPtB). The thickness of the magnetic layer is consistent with conventional practices and manufacturing a magnetic recording medium. Cobalt-base alloys having a thickness of about 100 Å to about 1000 Å, such as 200 Å to about 500 Å, has been found suitable.

As in conventional practices, an underlayer can be deposited on the textured substrate prior to depositing the magnetic layer. The underlayer can comprise Cr or a Cr-alloy, such as chromium-vanadium or chromium-titanium, oxygen-doped Cr, tungsten or a tungsten alloy.

In addition, a protective overcoat, such as a carbon overcoat, can be deposited on the magnetic layer, and a lubricant topcoat deposited on the protective overcoat. The underlayer, magnetic layers and protective overcoat can be applied in a conventional manner, by any of various sputtering techniques employed in production of magnetic recording media.

The present invention can be employed to produce any of various types of magnetic recording media, including thin film disks, with an attendant improvement in flying stability, glide performance and head-medium interface reliability. In accordance with the present invention, a magnetic recording medium is provided with a textured surface comprising a data zone, textured landing zone comprising a plurality of protrusions extending to a substantially uniform height above the surface, and a textured transition zone, wherein the transition zone comprises a plurality of protrusions having gradually reduced heights and diameters in progressing from the landing zone to the data zone. The data zone can be polished or textured as by a mechanical texturing techniques. The landing zone can also be textured by mechanical texturing or laser texturing. In accordance with the present invention, the transition zone is laser textured employing a pulsed laser light beam, wherein the peak pulse power and/or rotating speed of the substrate is varied to provide a plurality of protrusions having spirally reduced heights and diameters in progressing from the landing zone to the data zone. Typically, the landing zone has a peak surface roughness (Rp) of about 15 to about 20 nm, while the data zone has a peak surface roughness (Rp) of about 2 to about 3 nm.

Only certain embodiments of the invention and but a few examples of its versatility are shown and described in the present disclosure. It is to be understood that the invention is capable of use in various other combinations and environments and is capable of changes or modifications within the scope of the inventive concept as expressed herein.

I claim:

1. A magnetic recording medium having a surface which comprises:

a data zone;

a laser textured magnetic head landing zone comprising a first plurality of protrusions extending to a substantially uniform height above the surface; and a laser textured transition zone formed by exposing the surface between the landing zone and the data zone to a pulsed laser light beam, wherein the transition zone comprises a second plurality of protrusions having gradual spirally lowered heights and smaller diameters in progressing from the landing zone to the data zone.

2. The magnetic recording medium according to claim 1, wherein the data zone is polished.

3. The magnetic recording medium according to claim 1, wherein the data zone is textured.

4. The magnetic recording medium according to claim 3, wherein the data zone is mechanically textured.

5. The magnetic recording medium according to claim 1, wherein the landing zone has a peak surface roughness (Rp) of about 15 to about 20 nm, and the data zone has a Rp of about 2 to about 3 nm.

6. The magnetic recording medium according to claim 1, comprising a nonmagnetic substrate and, sequentially formed thereon, in the recited order, a magnetic layer, a protective overcoat and a lubricant topcoat; wherein the textured surface is provided on the substrate and is substantially replicated on subsequently deposited layers.

7. The magnetic recording medium according to claim 1, wherein the magnetic recording medium comprises a nonmagnetic substrate and, sequentially formed thereon, in the recited order, an underlayer, a magnetic layer, a protective overcoat and a lubricant topcoat; wherein the textured surface is provided on the underlayer and is substantially replicated on subsequently deposited layers.

8. The magnetic recording medium according to claim 7, wherein the underlayer comprises chromium or a chromium-alloy.

9. The magnetic recording medium according to claim 1, comprising a nonmagnetic substrate formed of a glass, a glass-ceramic material, aluminum, an aluminum alloy, nickel-phosphorus coated aluminum or a nickel-phosphorous coated aluminum alloy.

10. A method of manufacturing a magnetic recording medium comprising a non magnetic substrate, an underlayer on the substrate and a magnetic layer on the underlayer, which method comprises:

forming a textured surface on a surface of the non magnetic substrate or underlayer, which textured surface comprises:

a data zone;

a laser textured magnetic head landing zone comprising a first plurality of protrusions extending to a substantially uniform height above the surface; and a laser textured transition zone; wherein the transition zone is formed by exposing the surface between the landing zone and the data zone to a pulsed laser light beam having a peak power while rotating the surface at a speed, and wherein the transition zone comprises a second plurality of protrusions having gradual spirally lowered heights and smaller diameters in progressing from the landing zone to the data zone.

11. The method according to claim 10, comprising sequentially forming, in the recited order, the data zone, the landing zone and the transition zone.

12. The method according to claim 11, comprising:

polishing the surface;

laser texturing to form the landing zone leaving a polished data zone; and laser texturing to form the transition zone.

13. The method according to claim 12, comprising controlling the heights and diameters of the protrusions in the transition zone by varying a peak power of the pulsed laser light beam and/or varying a rotating speed of the surface.

14. The method according to claim 13, comprising reducing the peak power of the pulsed laser light beam and/or increasing the speed of the rotating surface while progressing from the landing zone to the data zone to form the transition zone.

15. The method according to claim 10, comprising:

forming the textured surface on a nonmagnetic substrate; and forming sequentially thereon, in the recited order, a magnetic layer, a protective overcoat and a lubricant topcoat; wherein substantially the same textured surface appears on the subsequently deposited layers.

16. The method according to claim 10, comprising:

forming an underlayer on a nonmagnetic substrate;

forming the textured surface on the underlayer; and forming sequentially thereon, in the recited order, a magnetic layer, a protective overcoat and a lubricant topcoat; wherein substantially the same textured surface appears on the subsequently deposited layers.

17. The method according to claim 16, wherein the underlayer comprises chromium or a chromium-alloy.

18. The method according to claim 10, wherein the magnetic recording medium comprises a non-magnetic substrate containing a glass, a glass-ceramic material, aluminum, an aluminum alloy, nickel-phosphorous coated aluminum or a nickel-phosphorous coated aluminum alloy.

19. The method according to claim 10, comprising texturing the data zone.

20. The method according to claim 19, comprising mechanically texturizing the data zone.

21. The method according to claim 18, wherein the substrate comprises the glass or the glass-ceramic material.

22. The method according to claim 21, comprising laser texturing the landing zone and/or transition zone by exposing the surface of the non-magnetic substrate to a pulsed focused laser light beam having a wavelength of about 10 $\mu$m.

23. The method according to claim 22, wherein the laser light beam is derived from a $CO_2$ laser light source.

24. The method according to claim 10, comprising laser texturing the landing zone and/or transition zone by exposing the surface to a pulsed laser light beam through a multiple lens focusing system containing a first lens and a second lens spaced apart from and positioned between the first lens of the upper surface of the substrate to form a focused laser light beam.

25. The method according to claim 10, comprising laser texturing the landing zone and/or data zone by passing a focused laser light beam through an optical crystalline material to the surface undergoing laser texturing.

26. The method according to claim 24, comprising passing the focused laser light beam through an optical crystalline material interposed and spaced apart between the lens focusing system and the surface undergoing laser texturing.

27. The method according to claim 22, comprising exposing the upper surface to a pulsed laser light beam through a multiple lens focusing system containing a first lens and a second lens spaced apart from and positioned between the first lens and the upper surface of the substrate to form a focused laser light beam.

28. The method according to claim 27, further comprising passing the pulsed focused laser light beam through an optical crystalline material interposed and spaced apart between the lens focusing system and the surface undergoing laser texturing.

29. The method according to claim 22, comprising passing the pulsed focused laser light beam through an optical crystalline material to the surface undergoing laser texturing.

* * * * *